(12) United States Patent
Kobayashi et al.

(10) Patent No.: US 10,461,918 B2
(45) Date of Patent: Oct. 29, 2019

(54) DATA TRANSMISSION SYSTEM

(71) Applicant: MEGACHIPS TECHNOLOGY AMERICA CORPORATION, San Jose, CA (US)

(72) Inventors: Alan Kobayashi, San Jose, CA (US); Rajanatha Shettigara, San Jose, CA (US); Ramakrishna Chilukuri, San Jose, CA (US); Rahul Kumar Agarwal, San Jose, CA (US); Nobuhiro Yanagisawa, San Jose, CA (US); Sujan Valiyaka Thomas, San Jose, CA (US); Ryuichi Moriizumi, San Jose, CA (US); Satoru Kumashiro, San Jose, CA (US)

(73) Assignee: MEGACHIPS TECHNOLOGY AMERICA CORPORATION, San Jose, CA (US)

( * ) Notice: Subject to any disclaimer, the term of this patent is extended or adjusted under 35 U.S.C. 154(b) by 0 days.

(21) Appl. No.: 16/119,581

(22) Filed: Aug. 31, 2018

(65) Prior Publication Data
US 2019/0028262 A1 Jan. 24, 2019

Related U.S. Application Data

(63) Continuation of application No. PCT/US2017/029753, filed on Apr. 27, 2017.
(Continued)

(51) Int. Cl.
*H04L 7/00* (2006.01)
*H04L 7/033* (2006.01)
*H04L 7/04* (2006.01)

(52) U.S. Cl.
CPC .......... *H04L 7/0037* (2013.01); *H04L 7/0331* (2013.01); *H04L 7/041* (2013.01); *H04L 7/044* (2013.01)

(58) Field of Classification Search
CPC ..... H04L 7/0037; H04L 7/0331; H04L 7/041; H04L 7/044; H04L 45/24; H04L 2027/11877; H05K 1/0248
(Continued)

(56) References Cited

U.S. PATENT DOCUMENTS 4,031,317 A * 6/1977 McClain ............... H03L 7/0993
375/358
6,288,656 B1 * 9/2001 Desai ...................... H04L 7/041
341/100
(Continued)

OTHER PUBLICATIONS

International Search Report and Written Opinion of the International Searching Authority dated Aug. 29, 2017 in International Application PCT/US2017/029753.
(Continued)

*Primary Examiner* — James M Perez
(74) *Attorney, Agent, or Firm* — Xsensus LLP

(57) ABSTRACT

A data transmission method includes, detecting an incoming link training sequence that is transmitted from an upstream transmitter, generating a marker indicating a timing location of a word included in the incoming link training sequence, generating a self link training sequence based on a local reference clock, adjusting a time difference in the incoming link training sequence and the self link training sequence, and retransmitting an incoming bit stream based on the self link training sequence being matched to the incoming link training sequence.

10 Claims, 4 Drawing Sheets

Related U.S. Application Data

(60) Provisional application No. 62/329,792, filed on Apr. 29, 2016.

(58) Field of Classification Search
USPC .................................. 375/54, 362–372, 354
See application file for complete search history.

(56) References Cited

U.S. PATENT DOCUMENTS

| | | | | |
|---|---|---|---|---|
| 6,307,868 | B1* | 10/2001 | Rakib | H03M 13/256 |
| | | | | 348/E7.07 |
| 7,010,607 | B1* | 3/2006 | Bunton | H04L 1/18 |
| | | | | 709/228 |
| 8,083,417 | B2* | 12/2011 | Aronson | G02B 6/3817 |
| | | | | 385/14 |
| 8,462,880 | B2* | 6/2013 | Lin | H04B 15/02 |
| | | | | 375/257 |
| 9,337,993 | B1* | 5/2016 | Lugthart | H04L 7/033 |
| 9,876,709 | B1* | 1/2018 | Jones | G06F 12/00 |
| 10,009,214 | B1* | 6/2018 | Farhoodfar | H04L 43/0847 |
| 10,241,949 | B2* | 3/2019 | Kobayashi | G06F 13/4282 |
| 2001/0038674 | A1* | 11/2001 | Trans | H04B 1/00 |
| | | | | 375/355 |
| 2002/0064175 | A1* | 5/2002 | Traverso | H03L 7/0814 |
| | | | | 370/442 |
| 2004/0096004 | A1* | 5/2004 | Wang | H04L 25/03885 |
| | | | | 375/257 |
| 2007/0041405 | A1* | 2/2007 | Navada | H04L 7/10 |
| | | | | 370/503 |
| 2007/0237468 | A1* | 10/2007 | Aronson | G02B 6/3817 |
| | | | | 385/100 |
| 2008/0186213 | A1* | 8/2008 | Sharma | H03K 5/135 |
| | | | | 341/100 |
| 2008/0250170 | A1* | 10/2008 | Sheafor | G06F 13/4059 |
| | | | | 710/61 |
| 2008/0250184 | A1* | 10/2008 | Sheafor | G06F 13/385 |
| | | | | 710/306 |
| 2010/0283532 | A1* | 11/2010 | Horan | G09G 5/003 |
| | | | | 327/530 |
| 2010/0302754 | A1* | 12/2010 | Nordin | G02B 6/4452 |
| | | | | 361/810 |
| 2013/0202016 | A1* | 8/2013 | Mohajeri | H04L 25/03878 |
| | | | | 375/219 |
| 2013/0340024 | A1* | 12/2013 | MacDougall | H04N 7/102 |
| | | | | 725/127 |
| 2014/0156879 | A1* | 6/2014 | Wong | G06F 11/3027 |
| | | | | 710/19 |
| 2014/0273833 | A1* | 9/2014 | McCormack | H04W 76/10 |
| | | | | 455/41.1 |
| 2015/0071311 | A1* | 3/2015 | Caggioni | H04J 3/16 |
| | | | | 370/540 |
| 2015/0078406 | A1* | 3/2015 | Caggioni | H04J 3/1664 |
| | | | | 370/537 |
| 2015/0098542 | A1* | 4/2015 | Yi | H04L 7/0331 |
| | | | | 375/373 |
| 2016/0056886 | A1* | 2/2016 | Kitamura | H04L 47/745 |
| | | | | 398/5 |
| 2017/0308493 | A1* | 10/2017 | Kobayashi | G06F 13/4282 |
| 2018/0225230 | A1* | 8/2018 | Litichever | G06F 21/56 |
| 2019/0020742 | A1* | 1/2019 | Healey | H04B 3/32 |
| 2019/0028262 | A1* | 1/2019 | Kobayashi | H04L 7/0037 |
| 2019/0108148 | A1* | 4/2019 | Paganini | G06F 13/20 |

OTHER PUBLICATIONS

"Universal Serial Bus 3.1 Specification", Hewlett-Packard Company, Revision 1.0, Jul. 26, 2013.

* cited by examiner

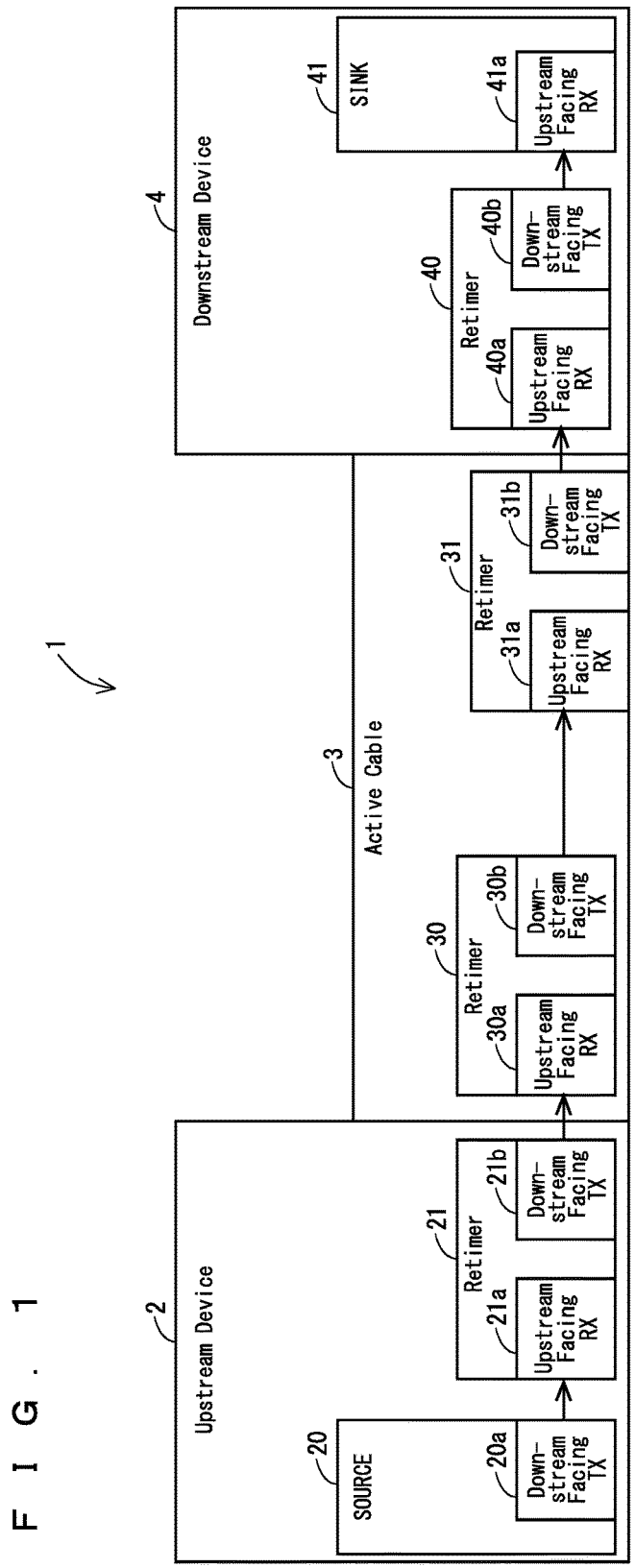
F I G. 1

DATA TRANSMISSION SYSTEM

TECHNICAL FIELD

The present invention relates generally to a data transmission method and a data transmission system which have Display Port (DP) and/or Universal Serial Bus (USB).

BACKGROUND ART

As high-speed data transmission interfaces, Display Port and USB are known. In these interfaces, a link training sequence is performed so that a synchronization between a source and a sink (Display Port) or between a host and a device (USB) is established. This sequence is usually performed after powered on and before starting a normal operation. In order to avoid high-speed serial bit stream signal quality degradation, a component type called "retimer" is defined in high-speed transport specifications such as USB3.1 and DP1.4. A retimer is used to extend the physical length of the system without accumulating high frequency jitter by creating separate clock domains on either side of the retimer. The retimer contains a clock-data recovery (CDR) circuit that retimes the signal and latches the signal into a synchronous memory element before retransmitting it.

PRIOR ART DOCUMENTS

Non-Patent Documents

Non-patent Document 1: Universal Serial Bus 3.1 specification, revision 1.0, Jul. 26, 2013

SUMMARY OF INVENTION

Problems to be Solved by the Invention

The delay in data transmission is preferably as small as possible.

Means for Solving the Problem

It is an object of fee present invention to provide a data transmission method and system for eliminating a transmission initiation delay and minimizing a retransmission delay by using a separate-reference-to-bit-level retimer (or "SR2BL retimer", for short). Note that "Sink training sequence" of the present invention includes both of a link training sequence of DP and a training sequence (TSEQ) of USB.

According to one aspect of the invention, a data transmission method includes, detecting an incoming link training sequence that is transmitted from an upstream transmitter, generating a marker indicating a timing location of a word included in the incoming link training sequence, generating a self link training sequence based on a local reference clock, adjusting a time difference in the incoming link training sequence and the self link training sequence, and retransmitting an incoming bit stream based on the self link training sequence being matched to the incoming link training sequence.

Also, according to another aspect of the invention, a data transmission system includes, a retimer having a local timing reference unit and a clock data recovery unit, in which a link training sequence of a data transmission is initially performed based on a local reference clock, generated from the local timing reference unit, and a normal operation sequence of the data transmission is transitioned from a local clock generated to a clock generated by the clock data recovery unit.

Effect of the Invention

The data transmission method and system of the present invention has following advantages:
1) Eliminates the transmission initiation delay inherent in a bit-level retimer by starting the transmission of a link training sequence using own local timing reference (=a separate reference operation)
2) Minimizes the retransmission delay inherent in a separate-reference retimer by seamlessly transitioning from separate-reference retimer operation to bit-level retimer operation before the end of the link training sequence.

BRIEF DESCRIPTION OF DRAWINGS

FIG. 1 is a block diagram of a data transmission topology with four retimers.

DESCRIPTION OF EMBODIMENTS

Figure 2:
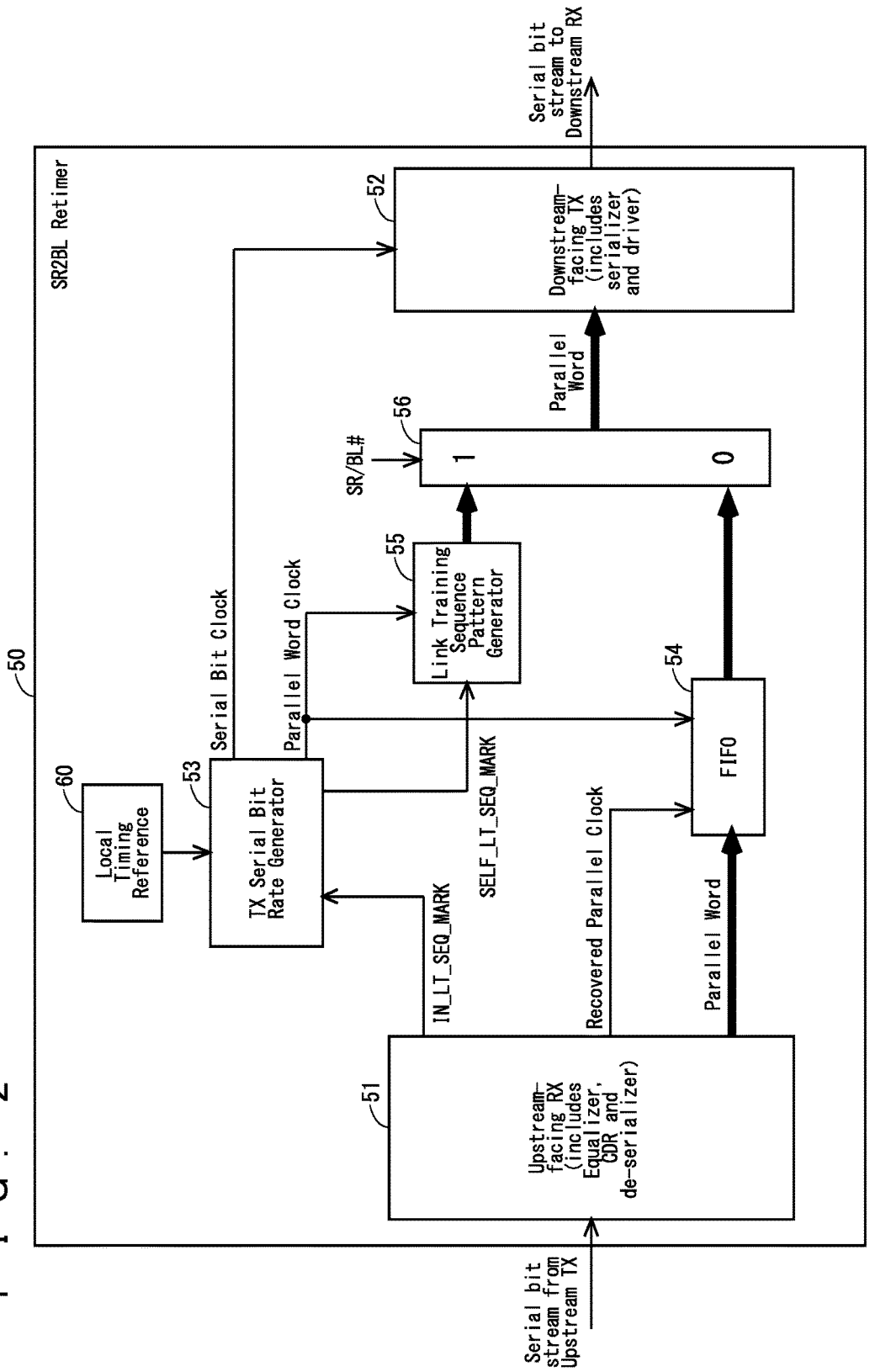
FIG. 2 is a block diagram of a separate-reference-to-bit-level retimer.

FIG. 1 illustrates an example of the data transmission system 1 having retimers. An upstream device (known as "Host" in USB or "Source" in DP) may have a retimer, an active cable may have two retimers on both ends of the cable, and a downstream device (known as "Device" in USB and "Sink" in DP) may have a retimer, resulting in four retimers cascaded between a downstream-facing transmitter (TX) within an upstream device and an upstream facing receiver (RX) within a downstream device.

As shown in FIG. 1, the data transmission system 1 is in accordance with DP1.4, for example, and includes an upstream device 2, a downstream device 4, and an active cable 3 connecting the upstream device 2 and downstream device 4.

The upstream device 2 includes a source 20 having a downstream facing TX 20a and a retimer 21 having an upstream facing RX 21a and a downstream facing TX 21b. The active cable 3 includes a retimer 30 having an upstream facing RX 30a and a downstream facing TX 30b and a retimer 31 having an upstream facing RX 31a and a downstream facing TX 31b. The retimer 30 is located in one end of a side of the upstream device 2 in the active cable 3. The retimer 31 is located in one end of a side of the downstream device 4 in the active cable 3. The downstream device 4 includes a retimer 40 having an upstream facing RX 40a and a downstream facing TX 40b. In the data transmission system 1, the retimes 21, 30, 31, and 40 are cascade-connected.

In the data transmission system 1 having the above configuration, the source 20 in the upstream device 2 generates a serial bit stream which is a video signal, for example. The source 20 transmits the generated serial bit stream from the downstream facing TX 20a to the retimer 21. The retimer 21 receives the serial bit stream transmitted from the downstream facing TX 20a in the upstream facing TX 21a. The retimer 21 performs a waveform shaping on the received serial bit stream and retimes the serial bit stream after being waveform-shaped and transmits the serial bit stream from the downstream facing TX 21b to the active cable 3.

The active cable 3 receives the serial bit stream transmitted from the upstream device 2 in the upstream facing RX 30a in one retimer 30. The retimer 30 performs a waveform shaping on the serial bit stream received by the upstream facing RX 30a and retimes the serial bit stream after being waveform-shaped and transmits the serial bit stream from the downstream facing TX 30b to the other retime 31. The retimer 31 receives the serial bit stream transmitted from the retimer 30 in the upstream facing RX 31a. The retimer 31 performs a waveform shaping on the serial bit stream received by the upstream facing RX 31a and retimes the serial bit stream after being waveform-shaped and transmits the serial bit stream from the downstream facing TX 31b to the downstream device 4.

The downstream device 4 receives the serial bit stream transmitted from the active cable 3 in the upstream facing RX 40a in the retimer 40. The retimer 40 performs a waveform shaping on the serial bit stream received by the upstream facing RX 40a and retimes the serial bit stream after being waveform-shaped and transmits the serial bit stream from the downstream facing TX 40b to a sink 41. The sink 41 displays a video, for example, based on the received serial bit data.

A transport latency introduced by a retimer gets multiplied as multiple retimers get cascaded. The resulting accumulation of latency can negatively affect the transport protocol between the upstream device and the downstream device to the extent the link fails to get established.

There are two retimer approaches. A bit-level retimer retimes an incoming serial bit stream and retransmits it using a serial bit clock recovered by a CDR of the upstream-facing RX. The bit-level retimer has an advantage in that it does not require transport-protocol processing (insertion and/or removal of dummy symbols (known as Skip Ordered Sets in USB3.1 spec) by the retimer. However, the bit-level retimer increases the latency in the serial bit stream retransmission initiation. It is because the bit-level retimer needs to have its CDR realize frequency and phase lock to the incoming serial bit stream, which takes multiple microseconds, before being able to start the retransmission. For some serial transport specifications, this retransmission initiation delay, especially when multiple bit-level retimers are cascaded, results in the transport timing specification violation.

Also, a separate-reference retimer retransmits the incoming serial bit stream with a serial bit clock generated from its own local timing reference which is independent from the clock generated by the CDR. However, to compensate the inherent rate difference between the incoming serial bit rate and the outgoing serial bit rate, insertion and/or removal of dummy symbols (known as Skip Ordered Sets in USB3.1 spec) in conjunction with an elastic buffer by the separate-reference retimer is required.

Described hereinafter is a data transmission system winch enables an elimination of a transmission initiation delay inherent in a bit-level retimer and also enables a reduction in a retransmission delay inherent in a separate-reference retimer.

FIG. 2 is an exemplary block diagram of a separate-reference-to-bit-level retimer (or the SR2BL retimer, for short) 50 of the present invention. The SR2BL retimer can be used as the retimers 21, 30, 31, and 40 shown in the above FIG. 1. Hereinafter, the SR2BL retimer 50 is also referred to simply as the retimer 50 in some cases. The retimer 50 is made up of a hardware circuit, for example. The retimer is deemed to have a circuitry.

As shown in FIG. 2, the retimer 50 includes an upstream facing RX 51, a downstream facing TX 52, a TX serial bit rate generator 53, a FIFO 54, a link training sequence pattern generator 55, and a selection circuit 56. The upstream facing RX 51 includes an equalizer, a CDR, and a de-serializer. The downstream facing TX 52 includes a serializer and a driver.

The upstream facing RX 51 generates a parallel word (10 bits, for example), a recovered parallel clock, and an incoming link training sequence marker (IN_LT_SEQ_MARK) based on the serial bit stream transmitted from the upstream TX and outputs them.

Figure 3:
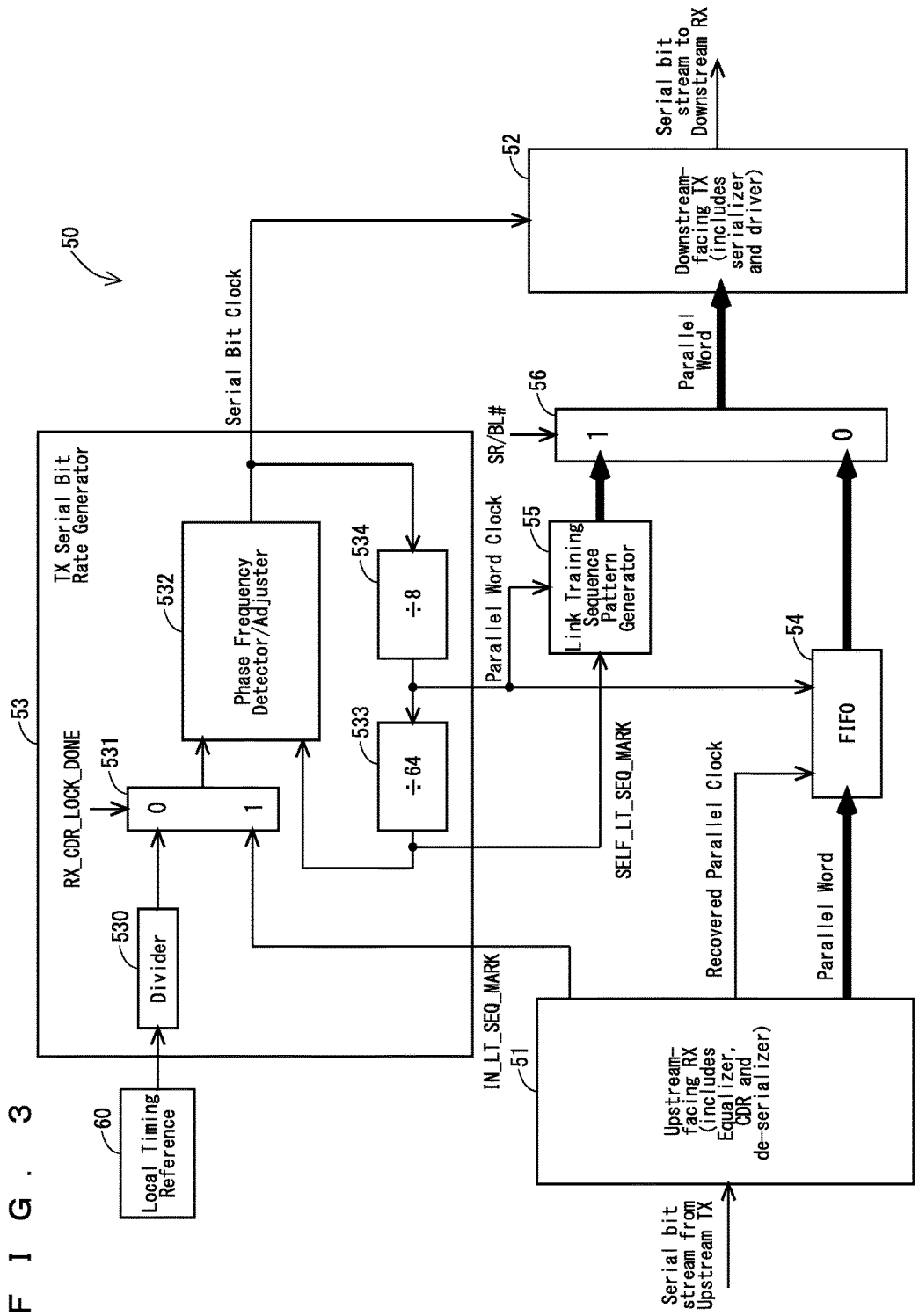
FIG. 3 is a block diagram of a PLL unit of a transmitter of the separate-reference-to-bit-level retimer.

The TX serial bit rate generator 53 generates a serial bit clock and a parallel word clock based on a local timing reference 60 (a type of reference clock) generated in the retimer 50 and outputs them. The TX serial bit rate generator 53 also generates a training sequence marker (SELF_LT_SEQ_MARK) of the retimer 50 itself and outputs it. The SELF_LT_SEQ_MARK is synchronized with the IN_LT_SEQ_MARK FIG. 3 is a block diagram mainly illustrating one example of a configuration of the TX serial bit rate generator 53. As shown in FIG. 3, the TX serial bit rate generator 53 includes a divider 530, a selection circuit 531, a phase frequency detector/adjuster 532, a ⅛ divider 534, and a 1/64 divider 533.

The divider 530 divides the local timing reference 60 and outputs it. The selection circuit 531 selects an output signal of the divider 530 or the IN_LT_SEQ_MARK based on a switching signal RX_CDR_LOCK_DONE and outputs a selected signal.

The ⅛ divider 534 performs ⅛ division of the serial bit clock being output from the phase frequency detector/adjuster 532 and outputs it. When the selection circuit 531 outputs the output signal of the divider 530, the output signal from the ⅛ divider 534 is output from the TX serial bit rate generator 53 as the parallel word clock.

The 1/64 divider 533 performs 1/64 division of the signal being output from the ⅛ divider 534 and outputs it. When the selection circuit 531 outputs the IN_LT_SEQ_MARK, the output signal from the ⅛ divider 534 is output from the TX serial bit rate generator 53 as the SELF_LT_SEQ_MARK.

The phase frequency detector/adjuster 532 synchronizes the output signal of the 1/64 divider 533 with the output signal of the selection circuit 531. Specifically, the phase frequency detector/adjuster 532 detects a phase difference and a frequency difference between the output signal of the 1/64 divider 533 and the output signal of the selection circuit 531 and adjusts a phase and frequency of the serial bit clock to be output so that the detected phase difference and the frequency difference are minimized. Thereby, the serial bit clock is synchronized with the local timing reference.

The FIFO 54 takes in, in synchronization with the recovered parallel clock, the parallel word being output from the upstream facing RX and stores it. The FIFO 54 outputs the stored parallel word in synchronization with the parallel word clock being output from the TX serial bit rate generator 53.

The link training sequence pattern generator 55 generates 8 parallel bits per parallel word clock. When the 8 parallel bits are concatenated over multiple parallel word clock cycles, they constitute an outgoing link training pattern. The link training pattern is repeated, marked with the SELF_LT_SEQ_MARK (which is a 10-bit character) at the beginning of the pattern.

Link training pattern is defined in a standard (for example, USB3.1). So the incoming link training pattern from the upstream device and the outgoing link training pattern the link training sequence pattern generator 55 generates are the same.

Once the TX serial bit rate generator 53 achieves the frequency and phase alignment of the outgoing link training sequence pattern to the incoming link training sequence pattern (synchronizes the SELF_LT_SEQ_MARK output from the 1/64 divider 533 with the IN_LT_SEQ_MARK output from selection circuit 531), the switch signal SR/BR# is cleared to 0, resulting in the retransmission of the incoming link training sequence pattern. As the frequency and phase alignment had already been achieved, the clearing of the switch signal SR/BR# to 0 does not cause the disruption of in the outgoing link training sequence pattern.

The selection circuit 56 selects data being output from the link training sequence pattern generator 55 or data being output from the FIFO based on the switch signal SR/BL# and outputs selected data.

The downstream facing TX 52 converts the data being output from the selection circuit 56 into the serial bit stream. The downstream facing TX 52 transmits the serial bit stream to the downstream RX in synchronization with the serial bit clock being output from the TX serial bit rate generator 53.

The operation of the retimer 50 having the above configuration makes a transition from the separate-reference retiming operation to the bit-level retiming operation. This transition is described in detail hereinafter.

To avoid the serial link transmission initiation delay, the SR2BL retimer 50 starts the transmission of the Sink initiation bit stream sequence (also known as link training sequence) using its own local timing reference 50.

Before starting the transmission of link training sequence, the SR28BL retimer 50 monitors the reception of incoming link training sequence from the upstream TX. The purpose of the monitoring is the detection of the initiation of the link training sequence transmission by the upstream TX. This detection is achieved by detecting the incoming differential pair toggling at a rate much higher than LPFS (low frequency periodic signaling) rate. The detection can be realized in a matter of few tens of serial bit period (also known as UI, or unit interval), which is multiple orders of magnitude shorter than multiple microseconds needed for the realization of frequency and phase lock of the CDR.

The downstream-facing TX 32 of the SR2BL retimer 50 initiates the transmission of the link training sequence as soon as it has detected the initiation of the sequence by the upstream TX, and awaits the CDR of the upstream-facing RX 51 to realize the frequency and phase lock to the incoming link training sequence.

Once the CDR has realized the frequency and phase lock to the incoming link training sequence (RX_CDR_LOCK_DONE=1), the upstream-facing RX 51 starts generating the incoming link training sequence marker (IN_LT_SEQ_MARK) which indicates the timing location of the parallel word representing the first link symbol of the repetitive link training sequence.

For USB3.1 Super Speed mode at 5 Gbits per second, for example, the link training sequence called TSEQ sequence consists of 64 link symbols (each symbol having 10 serial bits, 0.2 ns each) starting with K28.5− of ANS18b/10b channel code and repeats 32,768 times, thus lasting over 4 ms. Therefore, K28.5− is to be used as IN_LT_SEQ_MARK.

The SR2BL retimer 50, while in a separate reference operation, generates its own link training sequence marker (SELF_LT_SEQ_MARK, which is K28.5−).

Figure 4:
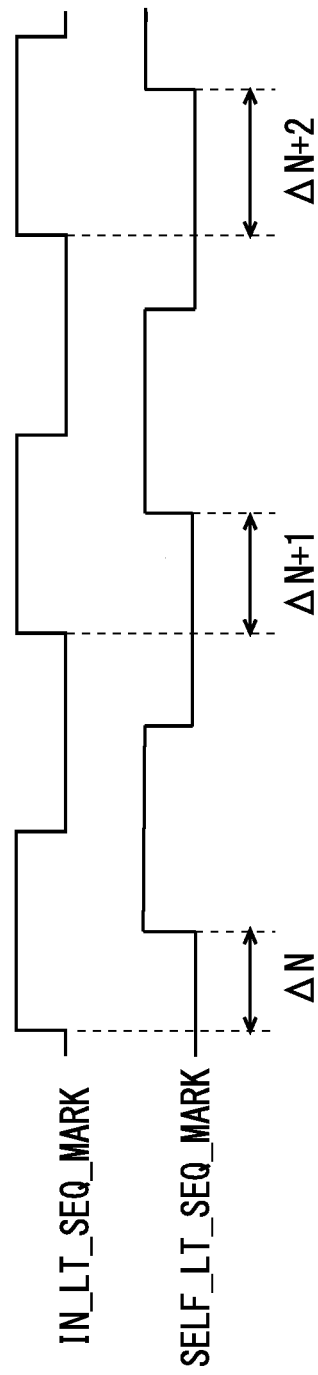
FIG. 4 is a timing diagram depicting timing signals of IN_LT_SEQ_MARK and SELF_LT_SEQ_MARK.

FIG. 4 indicates a timing diagram depicting timing signals of IN_LT_SEQ_MARK and SELF_LT_SEQ_MARK. TX Serial Bit Rate Generator 53 measures the time delta between IN_LT_SEQ_MARK and SELF_LT_SEQ_MARK and adjust the TX Serial Bit Rate Generator 53 to minimize the differences in measured delta's (i.e., frequency locking) and then to minimize the delta values (phase locking).

When the frequency and phase locking of SELF_LT_SEQ_MARK to IN_LT_SEQ_MARK is done, the phase frequency detector/adjuster 532 switches from the transmission of the internal link training sequence pattern to retransmission of the incoming serial bit rate by changing the switching signal RX_CDR_LOCK_DONE and the switching signal SR/BL# from 1 to 0. The switching from the transmission of the internal link training sequence pattern to retransmission of the incoming serial bit rate is done at the 10-bit code boundary of Link Training Sequence Marker. So, receiver will not see any discontinuity in the received Link Training symbol sequence. As a result, the switching is achieved in a manner not disturbing the symbol sequence.

The present invention has been described in connection with the preferred embodiment, it is not intended to limit the scope of the invention to the particular form set forth, but on the contrary, it is intended to cover such alternatives, modifications, and equivalents as may be included within the spirit and scope of the inventions as defined by the appended claims.

The invention claimed is:

1. A data transmission system, comprising:
a transmitter;
a receiver; and
retimer circuitry provided between the transmitter and the receiver, the retimer circuitry having local timing reference circuitry and clock data recovery circuitry,
wherein
the retimer circuitry is configured to
start performing a link training sequence of a data transmission based on a local reference clock generated from the local timing reference circuitry, and
after starting the performing of the link training sequence, perform a normal operation sequence of the data transmission based on a clock generated by the clock data recovery circuitry and by transitioning from the local reference clock, and
the retimer circuitry is further configured to
generate an incoming link training sequence marker based on a serial bit stream received from the transmitter,
generate a self link training sequence marker during the link training sequence, and
adjust a time difference in the incoming link training sequence marker and the self link training sequence marker before transmitting the serial bit stream to the receiver.

2. The data transmission system according to claim 1, wherein the retimer circuitry is configured to start the normal operation sequence before the end of the link training sequence.

3. The data transmission system according to claim 1, wherein
the retimer circuitry comprises an upstream-facing receiver having the clock data recovery circuitry, and
the upstream-facing receiver is configured to generate the incoming link training sequence marker.

4. The data transmission system according to claim 1, wherein the retimer circuitry comprises serial bit rate generator circuitry configured to generate the self link training sequence marker during the link training sequence.

5. The data transmission system according to claim 1, wherein the retimer circuitry is configured to perform the data transmission between a host and a device in a Universal Serial Bus.

6. The data transmission system according to claim 1, wherein the retimer circuitry is configured to perform the data transmission between a source and a sink in a Display Port.

7. A data transmission system comprising:
a transmitter;
a receiver; and
retimer circuitry provided between the transmitter and the receiver,
wherein
the retimer circuitry comprises:
an upstream-facing receiver configured to receive a serial bit stream from the transmitter and generate an incoming link training sequence marker,
serial bit rate generator circuitry configured to generate a self link training sequence marker based on a local timing reference, and
a downstream-facing transmitter configured to transmit the serial bit stream to the receiver in synchronization with a serial bit clock recovered from the serial bit stream after adjusting a time difference in the incoming link training sequence marker and the self link training sequence marker.

8. The data transmission system according to claim 7, wherein the retimer circuitry further comprises link training sequence pattern generator circuitry configured to receive the self link training sequence marker and a parallel word clock from the serial bit rate generator circuitry.

9. The data transmission system according to claim 7, wherein the transmitter and the receiver are a host and a device respectively in a Universal Serial Bus.

10. The data transmission system according to claim 7, wherein the transmitter and the receiver are a source and a sink respectively in a Display Port.

* * * * *